Dec. 28, 1965  J. P. GREENE  3,226,110
LEAF DISPENSER
Filed Nov. 8, 1963  5 Sheets-Sheet 1

INVENTOR
JOHN P. GREENE

BY Towson Price
ATTORNEY

Dec. 28, 1965    J. P. GREENE    3,226,110
LEAF DISPENSER
Filed Nov. 8, 1963    5 Sheets-Sheet 2
FIG. 4
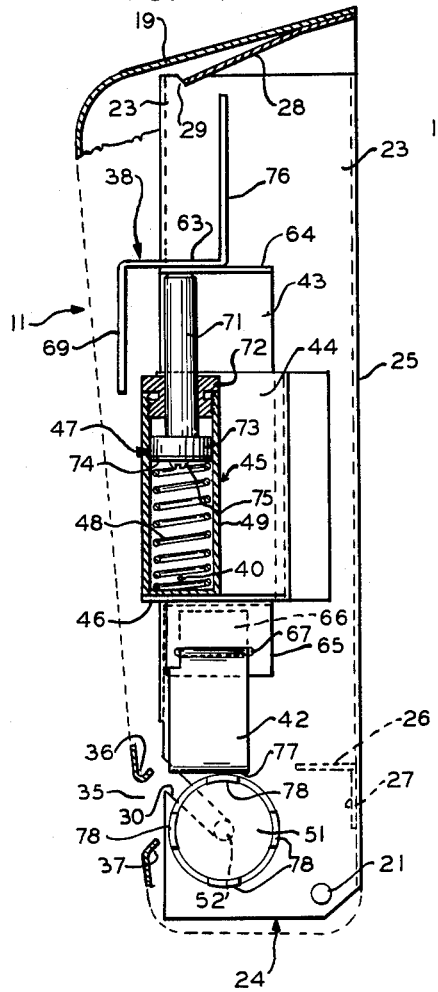
FIG. 6
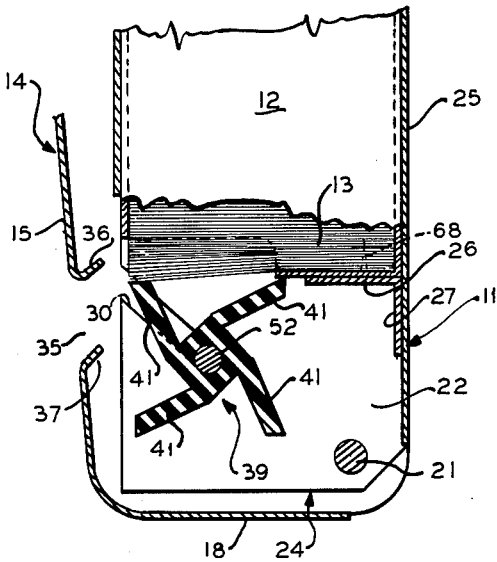
FIG. 7
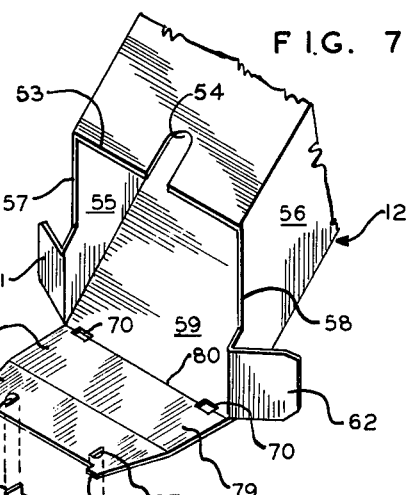
FIG. 12
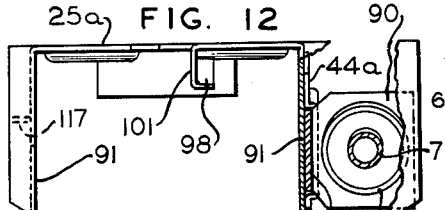
FIG. 11
INVENTOR.
JOHN P. GREENE
BY Towson Price
ATTORNEY

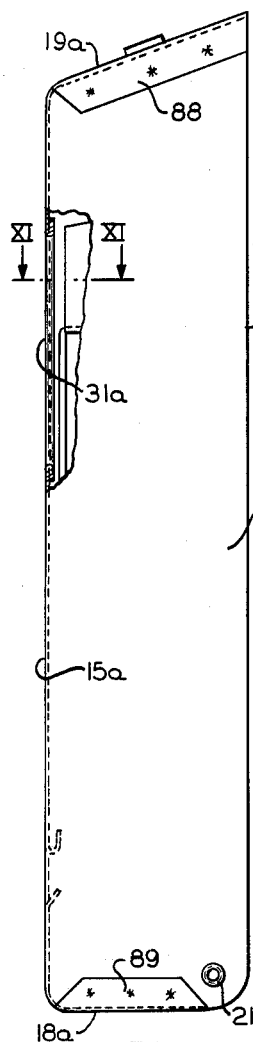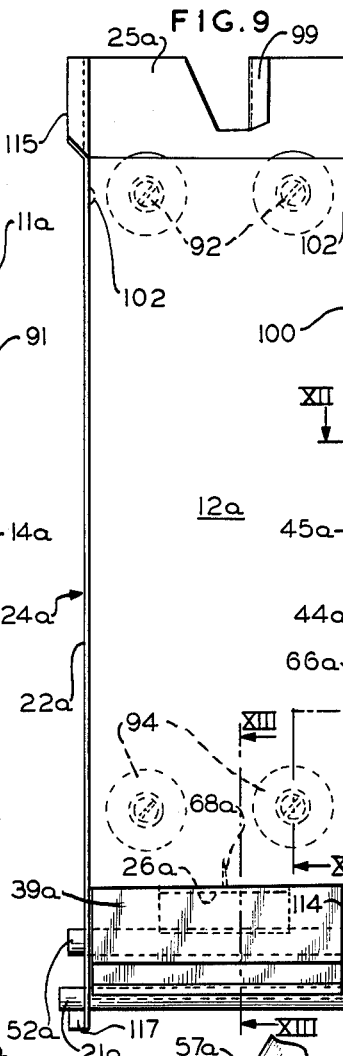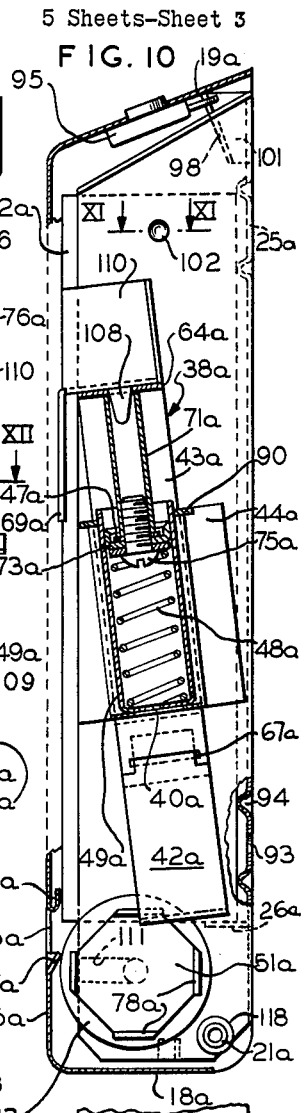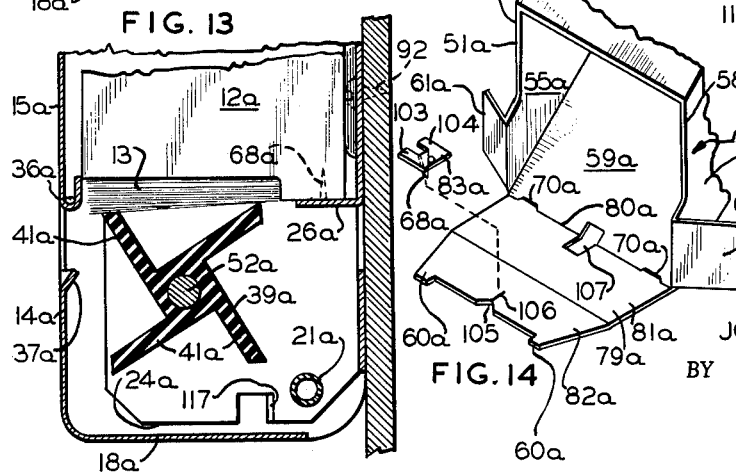

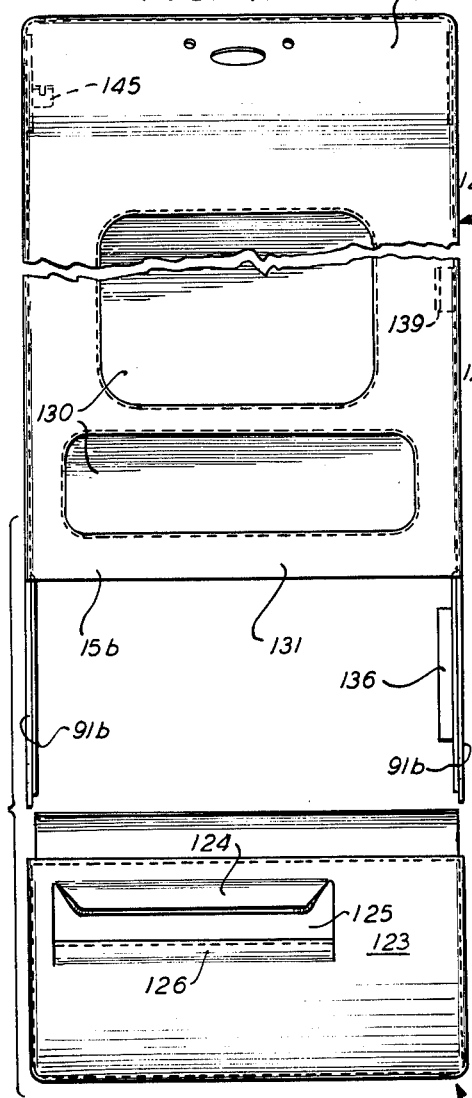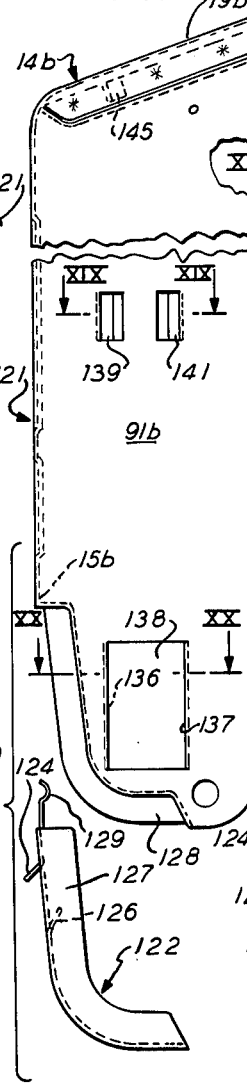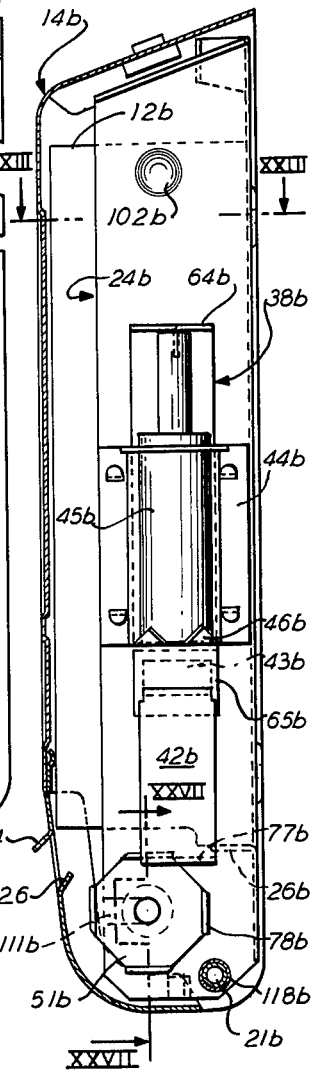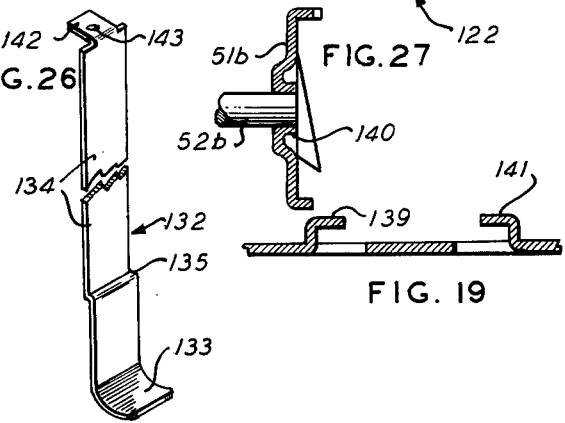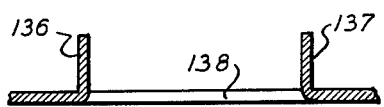

Dec. 28, 1965 J. P. GREENE 3,226,110
LEAF DISPENSER
Filed Nov. 8, 1963 5 Sheets-Sheet 5
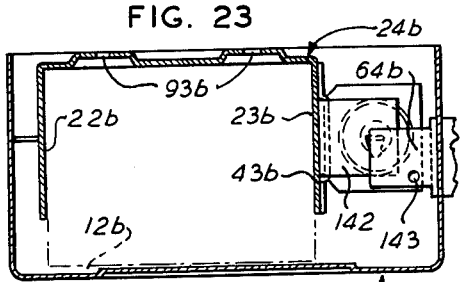
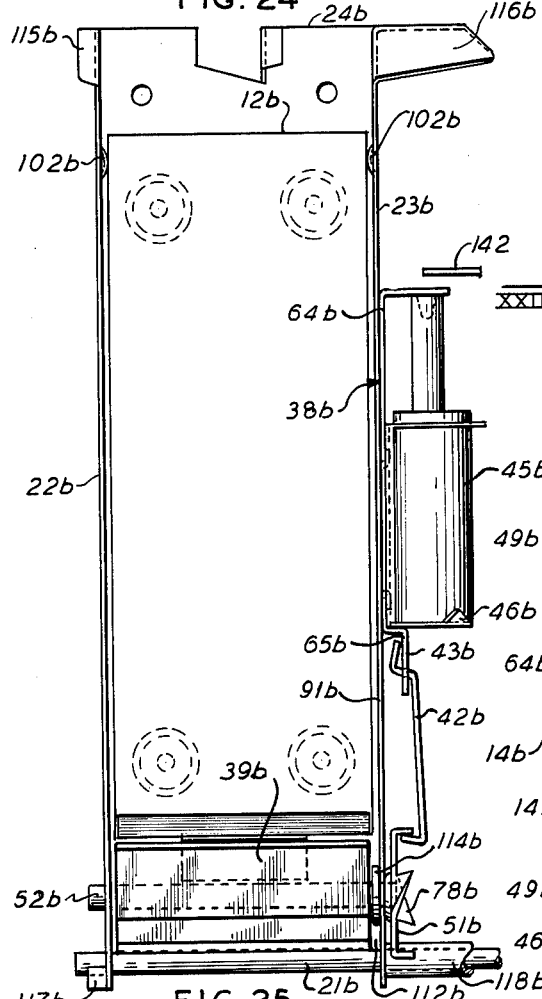
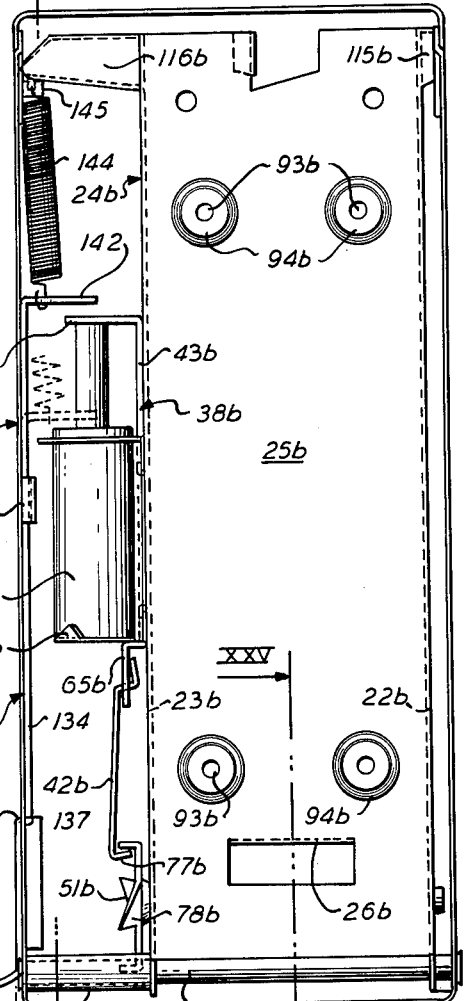
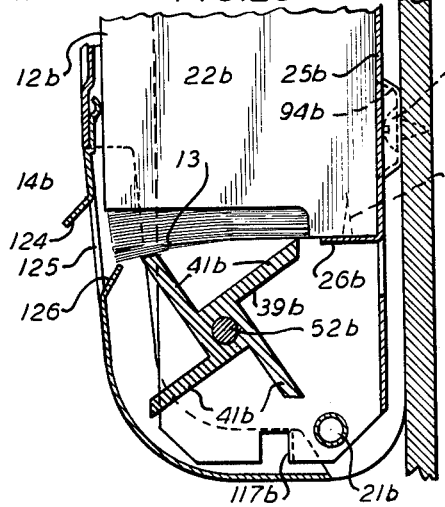
INVENTOR.
JOHN P. GREENE
BY
Towson Price
ATTORNEY

United States Patent Office 3,226,110
Patented Dec. 28, 1965

3,226,110
LEAF DISPENSER
John P. Greene, Mountain Lakes, N.J., assignor to Parachem Corporation, North Newark, N.J., a corporation of New Jersey
Filed Nov. 8, 1963, Ser. No. 323,202
23 Claims. (Cl. 271—41)

This application is a continuation-in-part of my application, Serial No. 271,229, filed April 8, 1963, now abandoned.

This invention relates to dispensing apparatus for soap leaves and other sheet material. It is designed primarily for use in public washrooms and is desirably of metal construction adapted to have a lock or other suitable device to prevent pilferage or tampering with the contents.

With the development of soap in the form of sheet material, an example being loose leaves or sheets to take the place of cakes or liquid, the problem arises how to dispense the leaves one at a time, in a convenient manner and without wastage. If the leaves are merely stacked, a prospective user with wet hands, even if he tried to take only one leaf from the top of such a stack, would inevitably waste some while not accomplishing any more from the standpoint of cleansing effect. The present invention is for avoiding such wastage by not only providing for the feeding one at a time of such cleansing leaves but also to discourage the withdrawal of more than one leaf to effect a given washing operation.

An object of the present invention is the provision of a dispenser for sheet material comprising a housing formed by a front wall, having a slot for the discharge of a leaf, and side walls for holding therein a stack of leaves of such material, said leaves being desirably contained in a carton or cartridge supported on a shelf in said housing, feeding means supportingly underlying the free edge portion of said leaves, and means for actuating said feeding means, said housing being also provided with another slot to afford access of the user to said actuating means.

Another object of my invention is to provide a dispenser as above described wherein a time-delay device is associated with said actuating means so that, upon an operation thereof to discharge a cleansing leaf, it is impossible to again reactuate it until a predetermined time has elapsed, thereby discouraging a user from withdrawing more cleansing leaves than necessary for a given washing operation.

A further object of my invention is to provide an enclosing carton for such leaves in a dispenser comprising a lower wall portion formed as a panel connected to the lower edge of the rear wall, formed as two sections hinged upon one another, and a metal plate with a sharp prong struck therefrom, portions of said plate bent at right angles, passed through corresponding slots in edge portions of said panel and bent thereover to hold said plate thereto, with the prong outstanding therefrom, the outer section being folded over the other section of said panel, holding the bent-over metal plate end portions therebetween, the folded sections turned to underlie the rear portion of said carton with the prong then upstanding and on which the rear portions of leaves in said carton are to be impaled, said folded-over sections being held beneath said leaves by tabs depending from the side walls of the carton and sandwiched therebetween when the leaves are supported thereon, the side walls and the front wall of said carton being relieved forwardly of said tabs to facilitate the removal of leaves.

A still further object of my invention is to provide a dispenser for leaves or sheet material, wherein the means actually engaging said material to remove it are flexible rubber-like vanes of a feeding device, which vanes are so disposed with respect to a stack of such leaves that one underlies the forward portion of the bottom leaf and the one immediately behind it underlies either another portion of said leaf or the part which supports the rear portions of said leaves, said vanes during a feeding operation bending to some extent so that they effect a desired functional engagement, comparable with or even better than that which could be obtained with the fingers.

Another object of my invention is to provide a dispenser as above described, wherein the time-delay device is what determines the speed of leaf discharge.

A further object of my invention is to provide a form of prong-carrying plate which is an improvement over that above described, in that it is simpler and more easily applied.

A still further object of my invention is to provide a third form of sheet material dispenser, which is an improvement over the other forms in that the housing is of two-piece construction to facilitate manufacture and permit greater freedom of design, the opening in the upper right hand corner of the housing of each of the first two forms has been replaced by one on the lower right hand side thereof through which an operating lever projects, said operating lever passing through said side opening, cooperating with the internal mechanism, and upwardly urged by a small tension spring with one end fixed to the top of the housing and the other to the top of the lever, making it unnecessary to incline the interior working mechanism, as in the second form, whereby it is aligned with the general longitudinal axis of the dispenser to facilitate manufacture which also involves an improvement in the means for mounting the dispenser, the shape of the bottom portion of the housing being rounded and angled inwardly to bring its surface closer to the leaves to be dispensed, thereby achieving a greater extension of exposed leaf when the dispenser is operated.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a front elevational view of one form of dispenser embodying my invention for leaves of cleansing material or the like.

FIGURE 4 is a side elevational view of the dispenser as shown in FIGURE 3, but with the lower part of the housing or cover indicated in dotted lines, except at the top and adjacent the leaf-discharging slot where it is shown in full lines in section.

FIGURE 6 is a fragmentary vertical sectional view on the line VI—VI of FIGURE 3, in the direction of the arrows.

FIGURE 7 is a fragmentary perspective view of the bottom portion of the leaf holding carton of the dispenser of FIGURES 1 to 6, inclusive, with the bottom wall members shown in open position and the to-be-supported pronged plate separated therefrom but with an indication of how it is to be connected.

FIGURE 8 is a side elevational view of a still better form of dispenser embodying my invention, with parts in section on the line VIII—VIII of FIGURE 11, in the direction of the arrows.

FIGURE 9 is a front elevational view of the dispenser of FIGURE 8 after the housing has been removed and a part broken away.

FIGURE 10 is a partial vertical sectional view of the dispenser on the line X—X of FIGURE 9, in the direction of the arrows, which includes an axial sectional view of the time-delay cylinder and associated parts, and a side elevational view of the chassis of the dispenser and associated parts.

FIGURE 11 is a plan of the dispenser as in FIGURE 8, with parts in horizontal section on the line XI—XI of FIGURES 8 and 10, in the direction of the arrows.

FIGURE 12 is a plan of the chassis of FIGURE 9, with parts in section on the line XII—XII thereof, in the direction of the arrows, and parts broken away.

FIGURE 13 is a fragmentary vertical sectional view on the line XIII—XIII of FIGURE 9, in the direction of the arrows.

FIGURE 14 is a fragmentary perspective view of the bottom portion of the leaf-holding carton of the dispenser of FIGURES 8 to 13, inclusive, with the bottom wall members shown in open positions and the to-be-supported pronged plate separated therefrom, but with an indication of how it is to be connected.

FIGURE 15 is a fragmentary plan of a portion of the bottom wall of said carton, after said pronged plate has been initially placed in position.

FIGURE 16 is an edge view of said bottom wall portion with said positioned plate.

FIGURE 17 is an exploded front elevational view of the upper and lower members or parts of a housing or cover for a third, and what I consider the best, form of dispenser embodying my invention.

FIGURE 18 is an exploded right side elevational view of the parts of the housing of my dispenser illustrated in FIGURE 17.

FIGURE 19 is a fragmentary horizontal sectional view, on the line XIX—XIX of FIGURE 18, in the direction of the arrows.

FIGURE 20 is a fragmentary horizontal sectional view, on the line XX—XX of FIGURE 18, in the direction of the arrows.

FIGURE 21 is a rear elevational view of the assembled third form dispenser, showing the chassis thereof enclosed in its housing or cover portion, with the outer and inner actuator parts shown in full lines when in a normal position and in dot-dash lines when in operated or depressed positions prior to the discharge of a leaf.

FIGURE 22 is a vertical sectional view, on the line XXII—XXII of FIGURE 21, in the direction of the arrows.

FIGURE 23 is a horizontal sectional view of the dispenser of FIGURE 22, on the line XXIII—XXIII thereof, in the direction of the arrows.

FIGURE 24 is a front elevational view of the chassis of FIGURE 22, after the housing has been removed.

FIGURE 25 is a fragmentary vertical sectional view on the line XXV—XXV of FIGURE 21, in the direction of the arrows.

FIGURE 26 is a fragmentary isometric view of the feed lever of the dispenser.

FIGURE 27 is a fragmentary vertical sectional view, on the line XXVII—XXVII of FIGURE 22, in the direction of the arrows.

Figure 1:
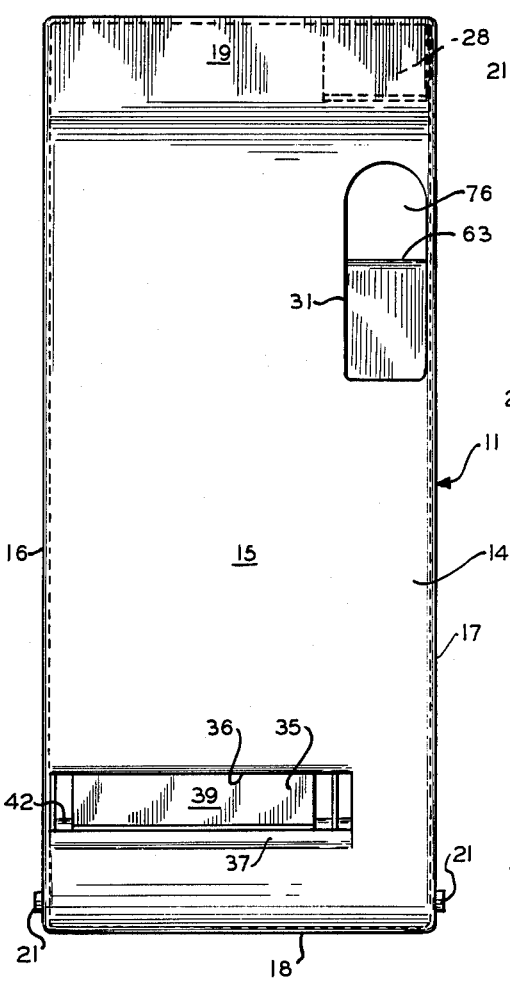
Figure 2:
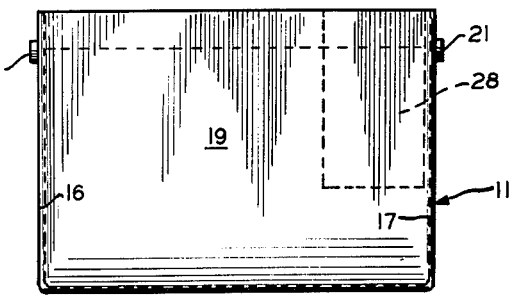
FIGURE 2 is a plan view of the dispenser of FIGURE 1.

Referring now to the drawings in detail, and first considering the embodiment of FIGURES 1 to 7, inclusive, there is shown in FIGURES 1 to 6, inclusive, a first form of a leaf dispenser especially adapted to feed sheets of soap, one at a time from the bottom of an enclosed stack thereof, and generally designated 11. This dispenser 11 is illustrated as using a refill cartridge or carton 12 to hold a stack of sheets, leaflets or leaves 13. The illustrated embodiment is well adapted for feeding leaves of material entitled "Detergent Film Composition," described and claimed in the Robert J. Anderson application, Ser. No. 762,938, filed September 24, 1958 commonly assigned, now abandoned after being replaced by continuation-in-part application, Serial No. 316,514, filed October 16, 1963. Such a stack can conceivably be employed with the enclosing cover of housing 14 of the dispenser and without a refill carton, although it would not be as convenient. The housing 14 of the dispenser 11 is desirably integrally formed of sheet metal. It comprises an inwardly and downwardly sloping front wall 15, normally vertical side walls 16 and 17, a normally horizontal bottom wall 18, and a forwardly and downwardly sloping top wall 19.

The housing 14 is supported on a pivot or shaft 21 passing through the side walls 16 and 17 thereof and through side walls 22 and 23 of a chassis or frame 24. Said chassis 24 is, in turn, supported on a wall or from another vertical surface, as by means of screws or other securing means, not shown, passing through the rear wall 25 thereof. The chassis 24 is desirably provided with a shelf 26 formed as the normally-horizontal flange of a right-angular metal sheet 27, the vertical flange of which is secured to the rear wall 25 of the chassis as by brazing or welding.

The housing 14 is a pivoted by the rod 21 which passes through apertures in the side walls 16 and 17 thereof and through corresponding apertures in the side walls 22 and 23 of the chassis 24, so that it is swingable from the upright position illustrated to a position where it lies with its front wall nearly horizontal, although sloping slightly outward, and outstanding from the supporting wall and the chassis 24. It is held in its normal or closed position, as illustrated, by means of a latch in the form of a spring plate 28. The upper end portion of the plate 28 is secured to the inner surface of the top wall 19 of the housing 14, by suitable means such as brazing or welding, and the forward portion extends downwardly at an angle, as indicated in FIGURE 4.

When the housing 14 is swung up to its closed position, the latch 28 snaps into locking engagement with the chassis side wall 23, its free end being received in a notch 29 formed in the top edge thereof, thereby locking the housing in closed position. Unlocking of the spring plate or latch 28 is provided for by having an aperture 31 in the front wall 15 of the housing through which a finger may be inserted to raise the latch 28 and allow for swinging the housing 14 downwardly and outwardly.

Figure 3:
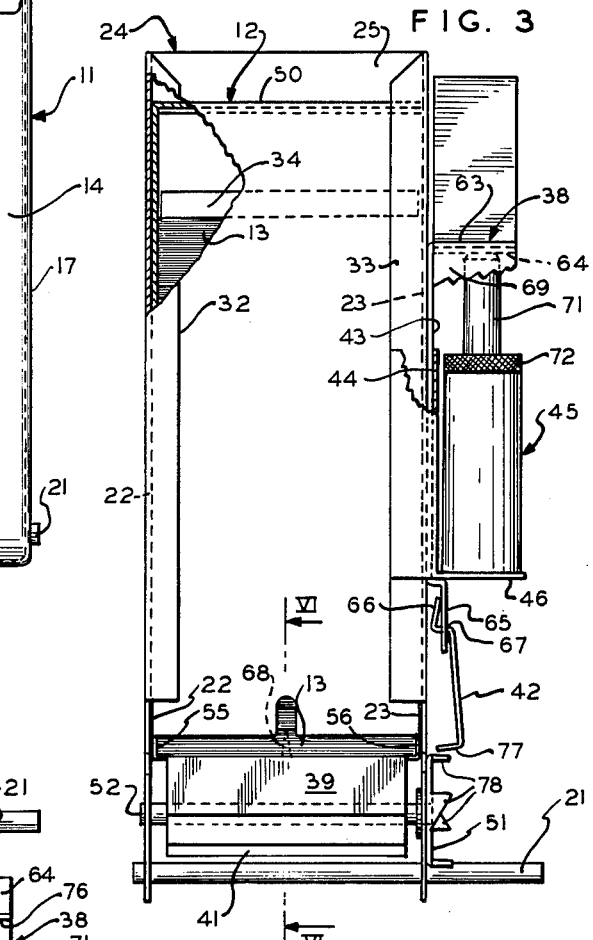
FIGURE 3 is a front elevational view of the dispenser as in FIGURE 1, but after the cover or housing thereof has been removed and portions of the supporting chassis and holding carton broken away to show top parts thereof in vertical section.
Figure 5:
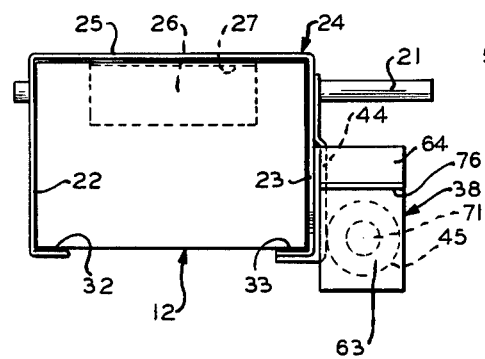
FIGURE 5 is a plan of the parts of the dispenser shown in FIGURE 3.

The carton 12 holding the leaves 13 is supported on the shelf 26. It is guided in its placement and removal with respect to the chassis 24, not only between the side walls 22 and 23, but also between the rear wall 25 and flanges 32 and 33 bent toward one another from the front edges of said side walls. FIGURE 3 indicates that said carton may be closed at the top by conventional means 50.

Due to the relative lightness of the soap leaves for which this dispenser is particularly designed, but not limited to such, it is necessary that some device be used to help the leaves slides down the inside of the housing 14 or refill carton 12 thereof. This is especially true as said leaves become nearly used up leaving, say, a two-inch stack or less remaining in the dispenser. To solve this problem, I propose to use a block of wood 34 about one-half inch in thickness and of length and width corresponding with the size of the leaves. Such a thickness is desirable as it prevents the weight from tilting forward, with a tendency to slide out of the bottom of the carton when nearly empty.

FIGURES 3, 4 and 6 show mechanism which is desirably employed for feeding the bottom leaf 13 of a stack, so that it protrudes from a slot 35 in the front wall 15 of the housing 14. Said slot is desirably of a length slightly greater than the length of the leaves to be dispensed and defined at its upper and lower edges by flanges 36 and 37 sloping downwardly and forwardly, as illustrated in FIGURES 4 and 6, to form an outlet chute for the leaves. The chute is deep enough so that the leaves do not fail to project themselves therethrough as fed by the mechanism, and in registry with the lower part of the carton 12. This means that it is offset toward the left side wall 16 of the housing 14 because the carton is correspondingly offset to provide room for the feeding mechanism, generally designated 38.

Situated under the exposed leaflets is a paddle-wheel type feed roller 39 made of soft rubber or the like and provided with four vanes 41 spaced around the axis at 90 degree intervals. These vanes do not extend radially from the axis, but the plane of each vane desirably passes within about ¼ inch of the axis of rotation. The reason for this is that each rubber vane 41 can then flex or bend more readily as it is rotated and brought into contact with the bottom of the stack of leaves. If these vanes 41 did not bend, then it would be necessary for the whole stack 13 of leaves to be raised or lifted as a vane passed underneath. A purely radial type vane would flex but would not do this so readily as it would be shorter, stiffer, and subject to a lesser bending moment. The outer edge of the vane remains in contact with the leaf throughout the entire feeding stroke. There is necessarily some small lifting of the stack as the rubber feed roll 39 rotates through ¼ turn.

The setting of the parts is such that the rubber vane 41 which has just delivered a leaflet comes to rest under the bottom of the stack of leaves about ⅛ inch from the front surface or edge of the stack of leaves and definitely in contact with and supplying support to the stack. The next or succeeding vane, which will feed out the next leaflet, comes to rest in contact with the bottom of the carton 12 which encloses the leaflets. It is these two contact points which establish the position of the rubber feed roll after each stroke. The vane which has just delivered a leaflet has an important function. First, it is under the front or unsupported portion of the stack of leaflets and prevents them from sagging down over a long period of nonuse, such as a weekend or vacation. Second, the leaflet which has just been presented through the slot 35, is pinched very lightly between this vane and the bottom of the stack and is not free to fall from the dispenser.

There is a great tendency for a rubber vane 41 to snap a leaflet out with such velocity that it continues after completion of the stroke and either falls into a sink or on the floor. However, by positioning the axis of rotation of the rubber feed roll correctly, by designing the feed roll 39 with four vanes 41 of the correct length, and by locating the stack of leaflets at the proper elevation above the axis of rotation of the feed roll, the tip of the vane which has just delivered a leaflet serves a secondary purpose of pinching this leaflet very lightly between the vane and the bottom of the stack in an extended position, so that it may be grasped in the fingers of a user and easily withdrawn from the dispensing apparatus. The support of the stack of leaflets and prevention of their sagging down over extended periods of time is very vital to satisfactory operation of the dispenser.

An advantage of the four-vaned feeding device 39 over a simple rubber roller of equivalent diameter is that such a roller, cylindrical in shape, can feed a leaflet only until the back edge of the leaflet becomes positioned in the vertical center plane of the feed roller. Therefore, there is a definite limit to the length of feed which can be obtained with a simple cylindrical roller. With a flexible-vane type of feeding device, the edge of a vane contacts a leaflet at a point closer to the back edge of the leaflet, maintains this contact with the leaflet as it rotates, flexes as it rotates so as not to substantially lift the stack of leaves, and finally breaks the contact with the leaflet at a point well out in front of the vertical center plane of the feeding device. This flexural characteristic is very important and the non-radial construction of the vane plus the illustrated thickness of these vanes and the texture of the rubber are carefully designed to get the optimum action.

The vaned feed roll 39 is not hand rotated throughout the entire ¼ of a rotation. A substantial portion of this rotation or stroke is mechanically guaranteed as a locked-in type of action. However, the final few degrees of turn, possibly five to ten degrees, for any given stroke, results from an uncoiling or straightening out action of the effective rubber vane as it pushes against the bottom of the stack and sets up a small couple about the axis of rotation. This action often causes the metal feed ratchet 51, on the right hand end of the carrying shaft 52 received in slots 30 in the side walls 22 and 23 of the chassis 24 and to which the feeder 39 is attached, to jump ahead of the actuating feed hook or pawl 42 which is pushing it. Another effect might be to cause the leaf being delivered to jump ahead as though it were flicked from the dispenser. The feed roller presents a generally square outline in end view. With the leaves pressing down on this feed roll, there is naturally a tendency, after a certain point in the rotation has been reached, from the force of the leaflets to continue to rotate the feed rool until a generally flat surface, provided by a slight beveling, as illustrated at the free edge of each vane, is in contact with the bottom of the stack of leaves. It is this condition which causes the feed roll to stop in the same relative position after each feeding stroke.

At no time is a leaflet 13 completely discharged from the dispensing apparatus 11 as contact is made and maintained at a point or line somewhat forward of the trailing edge of the leaflet. In fact, on completion of a cycle, the leaflet is conveniently positioned in an extended position but very lightly pinched and held in place between the bottom of the stack and the free edge of the feed vane 41 which has just delivered the leaflet in question. The protruding end portion of this leaflet can be easily grasped in the fingers and pulled the remaining ¼ to ⅜ inch from the dispensing apparatus. This is an important consideration as it keeps leaflets from falling to the floor or into a sink or basin.

The feed roller 39 is actuated by a very simple ratchet and pawl or feed hook type of device which changes the reciprocation of a feed bar or actuator 43 to a rotary action and utilizes a latching type device to get turning action in one direction only. The feed bar 43 is slidably carried in a guide 44 secured to a side of the chassis wall.

A combination return spring, time-delay device 45 is utilized in this dispenser. The time delay device is desirably supported on a flange 46 outstanding from the guide 44 and is used to prevent a rapid feeding of leaves and thus discourage pilferage. The delay might be two to four seconds between cycles. The time delay device is desirably a piston which functions as a pump and is combined with a return spring 48 in such a manner that the spring tries to push the piston against atmospheric pressure and draw a partial vacuum within an enclosing cylinder 49. However, a small hole 40 in the side or the end of the cylinder 49 allows air to slowly bleed into the cylinder and thus let the piston 47 slowly return, or if a slower action is desired, leakage may be solely relied on.

By referring to FIGURE 7, it will be seen that said carton 12 opens downwardly and is cut away or relieved at its lower front portion, as indicated at 53. Said front wall is also desirably slotted upwardly for a short distance, as indicated at 54, to give an indication of when the supply of leaves is almost exhausted. The side walls 55 and 56 of said carton are likewise cut away or relieved, as indicated at 57 and 58. Said walls adjacent the rear wall 59, that is, back of the relieved portions 57 and 58, are, however, not only not cut away but are desirably extended beyond the extreme bottom of the carton to form bottom wall supporting panels or tabs 61 and 62, respectively.

The rear wall 59 of the carton terminates in a panel 79 hinged thereto along line 80 at the extreme bottom of the carton. Said panel is formed in two sections, that is, section 81 hinged directly to the rear wall 59 and section 82 hinged to the edge of the section 81 remote from said rear wall. Secured to the section 82, desirably constructed as illustrated most clearly in FIGURE 7, is a metal strip or plate. This plate has a sharp prong 68 slit therefrom and bent out, as illustrated. The end portions of said plate are bent at right angles, as indicated at 84, passed through slots or apertures 86 and 87, respectively, in the section 82 and bent over said section toward one another to gripping relationship therewith.

This connection holds the prong 68 outstanding from the surface of the section 82 which faces downwardly when the carton is positioned as viewed in FIGURE 7, but which faces in the opposite direction when the section 82 is bent up over the section 81 and the whole folded panel bent up to underlie the lower portion of the carton and extend at right angles to the rear wall 59 thereof. When this occurs, the tabs 61 and 62 are sandwiched between the sections 81 and 82, and the tongues 60 formed on the free edge of the section 82 may be passed into cooperating slots 70 on the line of the hinge 80. When a stack of leaves 13 rests on the folded panel 79, it presses the section 82 down on the section 81, frictionally gripping the tabs 61 and 62 between said sections which thus form a firm support for the rear portion of a stack of leaves 13.

It will be seen from the foregoing description that the panel construction, heretofore described, provides a prong or needle 68 which points upward beneath a supported stack of leaves and on which the lower members in said stack are impaled. I have found that such needle will cleanly slice each leaf or film, as the latter is pulled away, so that there will be no necessity for any further action and the function will be satisfactory.

Before operating an assembled dispenser 11 embodying my invention, the housing 14 would be released by upward pressure on the latch 28, swung out and down to open position. A stack of leaves 13 would then be positioned so as to be supported by the shelf 26, desirably while contained in a carton 12 having a restraining needle 68 upstanding from a lower rearward wall portion. If a carton 12 is dispensed with, the leaves 13 would be directly held on a shelf 26 from which a needle 68 would upstand. The leaves 13 and weight 34 would then be guided between the side walls 22 and 23 of the chassis 24 and the rear wall 25 and flanges 32 and 33 of said side walls. The housing 14 would then be swung back and up until it latched in closed position.

To operate, the user inserts a finger in the same aperture 31 which was used on releasing the latch 28, but this time he would press down on a shelf or rest 63 carried by a flange 64 formed on the upper end of the feed bar 43. The feed hook 42 depends from the lower end portion 65 of said bar 43, desirably laterally offset as illustrated in FIGURE 3, as by having an upper portion 66 bent laterally, to pass through a slot 67 in the lower end part of the portion 65. It is then bent upwardly to lie between said portion 65 and the side wall 23 of the chassis 24. This allows for outward swinging of said hook from engagement with the ratchet 51 upon upward movement of the feed bar 43 under the influence of the return spring 48.

Such downward finger pressure on the shelf 63 effects a feeding operation of the roller 39. Said shelf 63 is disposed rearward of a depending portion 69, which shields the actuating rod 71 upstanding from the piston 47. The latter is guided through a cylinder closure device 72 threadably engaged in the upper end portion of the cylinder 49. The shelf 63 is formed with an upstanding portion 76 limiting inward movement of the finger. Approximate air tightness between the cylinder 49 and its piston may be secured by a leather packing member 73, like that in a hand tire pump, and a metal washer 74, of a size to form an abutment for the top of the spring 48, with both pressed into place by a holding screw 75. The upper end of the rod 71 and the lower end of the cylinder 49 may be respectively secured to the lower surface of the flange 64 and the upper surface of the flange 46, in a suitable manner.

This feeding operation of the roller 39 is effected from the shelf 63, through the downward movement of the feed bar 43, on which it is mounted, and the corresponding movement of the feed hook 42 depending from said bar. The consequent engagement by the lower flange 77 on said hook with one of the four teeth 78 on the ratchet 51, that is, the tooth at the left as viewed in FIGURE 4, turns the latter through about 90°, and compresses the spring 48. The flange 77 is of a depth at and near the front end extending for about one third of the distance toward the back end, as viewed in FIGURE 3, so as to engage said tooth 78 at the left, but decreases in depth toward the rear, so as not to engage the tooth 78 at the top of the ratchet 51, when said feed hook is moved downward. This causes a feeding action of the roller 39 on the lowermost leaf of the stack, leaving an end of said leaf protruding from the slot 35 to be pulled out by a user.

Release of the shelf 63 allows the spring 48 to again expand and return the parts to the position of FIGURE 3. This expansion and return is, however, slowed to the desired extent by the formation of a retarding partial vacuum in the cylinder 49. The hook 42 at the same time swings out along the inclined edge of the succeeding tooth 78 of the ratchet 51 and drops into place above its generally horizontal edge, ready for the next leaf-feeding operation.

Referring now to the embodiment of my invention illustrated in FIGURES 8 to 16, inclusive, a second embodiment is shown as an improved form of leaf dispenser 11a somewhat like the dispenser 11 of the first embodiment. This dispenser is, as in the preceding embodiment, illustrated as using a refill cartridge or carton 12a, similar to the carton 12 but slightly modified, as will be explained, to hold a stack of sheets, leaflets or leaves 13. The present embodiment is well adapted for feeding leaves of the same material as was disclosed for the first embodiment. Such a stack of leaves can conceivably be employed with the enclosing cover or housing 14a of the dispenser and without a refill carton, although it would not be as convenient.

The dispenser housing 14a is desirably formed integrally from sheet metal, the top and bottom sections, 19a and 18a, being continuations of the front section or wall 15a. Said housing 14a has flanges 88 and 89, which respectively extend from the top and bottom sections and respectively overlap the tops and bottoms of the side sections 91 and are secured thereto in any desired manner including spot welding. From FIGURES 8 and 10 it will be seen that the housing 14a comprises a normally vertical front wall 15a, normally vertical side walls 91, a normally horizontal bottom wall 18a and a forwardly and downwardly sloping top wall 19a.

The housing 14a is supported on a pivot or shaft 21a, desirably hollow, passing through the side walls 91 thereof and through side walls 22a and 23a of a supporting chassis or frame 24a. After assembly, the ends of the hollow shaft 21a are desirably peened or riveted over so as to prevent separation of the housing from the underlying chassis 24a. The chassis 24a is in turn supported on a wall or from a suitable vertical surface, as by means of screws or other securing means 92, passing through the rear wall 25a thereof. The apertures 93 through which the securing means 92 pass are desirably at the center of inwardly embossed annular portions 94, which form walls or ridges surrounding the means 92 and thereby prevent said means from scraping or otherwise interfering, during application or removal, with the rear wall of the carton 12a which holds said leaves, by engaging and forwardly spacing said carton rear wall.

The chassis 24a is shown provided with a shelf 26a, conveniently formed as by slitting it out of the rear wall thereof and bending it to a normally horizontal position, as viewed most clearly in FIGURES 9, 10 and 13, so as to underlie the carton 12a. The housing, by virtue of its pivoting on the rod 21a, is swingable from the closed position illustrated to a position where it lies with its front wall approximately horizontal and outstanding from the supporting wall and the chassis 24a. It is held in its normal or closed position by means of a spring latch in the form of a plate 28a which, in this embodiment, is part of a lock 95 operable from outside the housing by means of a key, not shown, insertable through a key hole 96.

The lock 95 may be secured inside of the top wall 19a by means of rivets or the like 97. The latch 28a is spring urged to the left, as illustrated in FIGURE 11, so that, upon closing the housing 14a, it will be moved to the right and then snap to the left over a shoulder 98 formed at the inner surface of a flange 99. Said flange 99 is here provided on the outer edge of a part 101 conveniently slit from the rear wall 25a of the chassis and bent outwardly at right angles thereto, as illustrated in FIGURES 9 to 12, inclusive.

When the housing 14a is swung up from open position, the latch 28a snaps into locking engagement with the chassis flange 99, thereby locking the housing in closed position. Unlocking is thereafter necessarily effected by means of the key referred to as operating in the lock 95.

The carton 12a holding the leaves 13a is supported on the shelf 26a. It is guided in its placement and removal with respect to the chassis 24a, not only between the side walls 22a and 23a but also between the embossments 94 on the rear wall 25a and projections 102. The latter are formed by inwardly pressing the side walls 22a and 23a to an extent such that detents are provided for gripping the side walls of the carton 12a near the top thereof, as shown most clearly in FIGURES 9 and 10.

These gripping portions 102 take the place of the flanges 32 and 33 on the chassis of the preceding embodiment, thereby preventing the carton 12a from falling forward when the housing 14a is swung outward, while at the same time making it possible to load the carton in the chassis from the front rather than by sliding it down from the top. This makes it possible to mount the dispenser close beneath a shelf, or other projection on a wall, which would interfere with the insertion and removal of the carton from above. The carton 12a of the present embodiment may be closed at the top by conventional means as in the preceding embodiment.

Due to the relative lightness of the soap leaves for which this dispenser is particularly designed, but not limited to, it is necessary that some device be used to help the leaves slide down inside of the chassis 24a or refill carton 12a thereof, especially as said leaves become nearly used up. I propose to use a block of wood, or other similar weight, such as that designated 34 in the preceding embodiment, but not here shown.

FIGURES 9, 10 and 12 show mechanism which is desirably employed for feeding the bottom leaf of a stack 13, so that it protrudes from a slot 35a in the front wall 15a of the housing 14a. Said slot is desirably of a length slightly greater than the length of the leaves to be dispensed. It is defined at its upper and lower edges by flanges 36a and 37a, sloping downwardly and forwardly, as illustrated most clearly in FIGURES 10 and 13, to form an outlet chute for the leaves.

The chute is deep enough, so that the leaves do not fail to project themselves therethrough as fed by the mechanism, and is in registry with the bottom part of the carton 12a. That is, said chute is offset toward the left side wall 91 of the housing 14a, because of the corresponding offset of the carton to provide the necessary space for the feeding mechanism generally designated 38a.

Situated under the exposed leaflets 13 is a paddle wheel type feed roller 39a of soft rubber or the like, provided with four vanes 41a spaced around its axis at 90° intervals. These vanes do not extend radially from the axis but the plane of each vane desirably passes within a short distance, say about one quarter inch, of said axis. The reason is so that each rubber vane 41a can flex or bend more easily as it is turned and brought into contact with the bottom of the stack of leaves 13. A purely radial type vane would flex but would not do so as readily.

The outer, relatively-sharp edge of each vane remains in contact with a leaf throughout the entire feeding operation. There is necessarily some small lifting action on the stack as the rubber feed roller 39a rotates through one quarter turn. It will be noted that said feed roller 39a is an improvement over that designated 39 in the preceding embodiment, in that the upper surfaces of the vanes, when active, are flat rather than canted backwardly at an angle as illustrated in FIGURE 6. The edges, however, or where they engage the bottom of the stack of leaves, desirably come to an acute angle, as in the preceding embodiment.

The cardboard container or carton 12a in the present embodiment has been changed by cutting away the side walls thereof to a greater extent, so that two vanes of the four-vaned feed roller 39a are now in contact with the bottom leaf, as viewed most clearly in FIGURE 13, as contrasted with the construction in the preceding embodiment where the forward vane was in contact with a leaf and the vane immediately behind it was in contact with the bottom of the carton.

The setting of the parts is such that the rubber vane 41a, which has just delivered a leaflet, comes to rest under the bottom of the stack of leaves about one-eighth inch from the front surface or edge of said stack and definitely in contact with and supplying support to the stack. The next or succeeding vane, which will feed out the next leaflet, also comes to rest in contact with the bottom of the stack of leaves at a position just slightly forward of where said stack is supported by the bottom wall of the carton. These two contact points determine the position of the rubber feed roller 39a after each stroke. The vane 41a which has just delivered a leaflet has an important function, which is the same as that described in connection with the first embodiment, except that now it has the assistance of the vane immediately following it.

The first embodiment avoided the great tendency for a rubber vane 41 to snap a leaflet out with such velocity that it continued after completion of the actuator stroke. However, it did not avoid the possibility of having a leaf fired out if the user pushed down on the feed bar quickly and hard enough. Therefore, the present embodiment simply loads a spring and the ratchet wheel is operatively rotated only on the return stroke. The velocity of the ratchet rotation is then a function of the spring design, the weight of the mass to be moved, the size of the air bleed hole, if used, in the spring-enclosing time-delay cylinder the design of said cylinder, and the frictional forces encountered. Thus, the present embodiment takes the control of the actual feeding time away from the operator. All he can do is to load the spring and the return action thereof establishes the speed at which the leaflet will be delivered.

The feed roller 39a in the present embodiment is actuated by a simple ratchet and pawl or feed hook type of device which changes the reciprocation of a feed bar 43a to a rotary action and utilizes a latching type device to get turning action in one direction only. The feed bar 43a is slidably carried in a guide 44a secured to the side of the chassis wall 23a, so that it tilts downward and slightly rearward, as contrasted with the normally vertical movement of the feed bar 43.

A combination return spring, time-delay device 45a is also utilized in this form of my dispenser. Said device is, however, operated differently and desirably supported on a flange 46a outstanding from the guide 44a and is used to prevent rapid feeding of leaves. The delay might be two to four seconds between cycles. The delay device is desirably a piston 47a which functions as a pump in a cylinder 49a. It is combined with a return spring 48a in such a manner that the spring tries to push the piston against atmospheric pressure and draws a partial vacuum in the enclosing cylinder 49a, with its axis inclined at a small angle to the vertical, as viewed in FIGURE 10. However, a small hole 40a in the cylinder 49a may allow air to bleed slowly thereinto and thus let the piston 47a correspondingly slowly return. If a longer time delay is desired, leakage may be solely relied on.

Referring to FIGURES 14, 15 and 16, it will be seen that the carton 12a opens downwardly and is cut away or relieved at its lower front portion, as indicated at 51a. The side walls 55a and 56a of said carton are likewise cut away or relieved to a greater extent than in the first embodiment, as indicated at 57a and 58a. The side walls adjacent the rear wall 59a, that is, back of the relieved portions are, however, not only not cut away but are desirably extended beyond the extreme bottom of the carton to form bottom wall supporting panels on tabs 61a and 62a, respectively.

The rear wall 59a of the carton terminates in a panel 79a hinged thereto along line 80a at the extreme bottom of the carton. Said panel is formed in two sections, that is, section 81a hinged directly to the rear wall 59a, and 82a hinged to the edge of the section 81a remote from said rear wall. Associated with the section 82a, desirably constructed as illustrated most clearly in FIGURE 14, is a metal plate 83a. This plate has a sharp prong 68a slit therefrom and bent out, as illustrated, leaving bifurcations 103 and 104.

The desired manner of securing the plate 83a to the panel 79a is to slide the prong 68a into a notch 105 at the extreme edge of the panel 82a and on into the slit 106 therein, with the bifurcation 104 on one side, each as the top, and the bifurcation 103 on the other side, such as the bottom, of the panel 82a, as viewed in FIGURES 15 and 16. This holds the plate 83a and its prong 68a tentatively in the desired position with respect to the panel 82a.

It will be seen that the prong 68a, viewed in FIGURES 14, 15 and 16, faces downwardly when the holding panel is so positioned. However, it faces in the desired opposite or upper direction when the section 81a is bent up and under the properly positioned tabs 61a, 62a and the section 82a folded thereover to underlie the lower portion of the carton 12a and extend at right angles to the rear wall 59a thereof. When this occurs, the tabs 61a and 62a are sandwiched between the sections 81a and 82a and the tongues 60a, formed at the free edge of the section 82a, may be passed into cooperating slots 70a on the hinge line 80a. When a stack of leaves 13 rests on the so folded panel 79a, it presses the section 82a down on the section 81a, frictionally gripping the tabs 61a and 62a and the plate 83a between said sections, which thus forms a firm grip on said plate and support for the rear portion of a stack of leaves 13 which is impaled on the prong 68a.

It will be seen from the foregoing description that the panel construction provides a prong or needle 68a which is pointed upward beneath a supported stack of leaves and which is a simplification of the prong construction of the preceding embodiment. I have found that such a needle 68a will cleanly slice each leaf or film so that there will be no necessity for any further action and the function will be satisfactory. However, in order to observe that there is no undesired accumulation of material around the needle, I desirably provide an opening 107 adjacent the hinge line 80a, through which the rear edges of leaves adjacent the needle may be observed.

A stack of leaves 13 will be positioned in the dispenser of the present embodiment in a manner similar to that described in connection with the preceding embodiment, except that, after opening the housing 14a, the positioned carton 12a containing the leaves would be directly held on the shelf 26a, while the upper portions of the carton are frictionally gripped by the projectors 102 on the side walls 22a and 23a of the chassis. The leaves 13 and the weight 34, as in the preceding embodiment, would then be guided between the walls of the carton as the leaves were withdrawn one by one from the bottom of the stack. The housing 14a, when swung to upper or closed position until it latches, would engage the front wall of the carton and hold it in place against the annular embossments 94.

In operation, the user inserts a finger in the aperture 31a in the front wall of the housing and presses down on a shelf or rest 63a carried by and secured to flange 64a formed on the upper end of the feed bar 43a, by suitable means such as spot welding. The feed hook or pawl-acting means 42a depends from the lower end portion 65a of said bar 43a. It is desirably offset, as indicated in FIGURE 9, as by having an upper portion 66a bent laterally to pass through a slot 67a in the lower end part of the portion 65a. It is then bent upwardly to lie between said portion 65a and the side wall 91 of the chassis 24a. This allows for outward swinging of said hook upon engaging with the ratchet 51a upon downward movement of the feed bar 43a as the operator presses thereon.

Such downward finger pressure on the shelf 63a effects a passing of the feed hook 42a over the rearmost one of the teeth 78a of the ratchet 51a. This action is provided for by the slight tilt of the feed bar 43a and the depending feed hook 42a. Said shelf 63a is disposed rearwardly of a depending portion 69a, which shields the actuating rod 71a upstanding from the piston 47a, and between upstanding side wall portions 100 and 110. Said rod is desirably hollow and receives a projection 108, desirably cut and depending from the flange 64a, thereby holding it against misalignment with the cylinder 49a. The cylinder is held in an aperture in a flange 90 projecting from the top of the guide 44a. It is prevented from slipping out of place by corner portions or tabs 109 upstanding from the lower flange 46a of said guide 44a. The shelf 63a is provided with an upstanding portion 76a limiting inward movement of the finger. Appropriate air tightness between the cylinder 49a and its piston 47a may be obtained by a leather packing member 73a held in place by a screw 75a, as illustrated most clearly in FIGURE 10, or in a manner similar to that of the preceding embodiment.

A feeding operation of the roller 39a is effected upon a return movement of the feed bar 43a and a corresponding movement of the feed hook 42a depending from said bar. The consequent engagement by the lower flange 77a on said hook with one of the four teeth 78a of the ratchet 51a, that is, the tooth at the right, as viewed in FIGURE 10, turns the latter through about 90° by action of the spring 48a expanding after release. After the lowermost leaf has been pulled from the stack 13 against the resistance imposed by the pronged plate 83a, a part of which is sandwiched between the bottom wall sections 81a and 82a, it is pushed out by the sequential operation of the underlying vanes 41a of the feed roller 39a. The action is thus controlled as previously described and not dependent on the whim of the user for speed of discharge. The dispenser may then be reset for the discharge of the next leaf by again pushing down on the shelf 63a. The feed hook 42a slides over the succeeding tooth 78a, during resetting, and, upon release of the shelf 63a, another leaf is discharged from the dispenser.

In order to allow for insertion and removal of the feed roller between the walls 22a and 23a of the chassis, the left wall 22a is apertured for reception of the roller shaft 52a, while the right wall 23a is provided with a slot 111, formed as shown in FIGURE 10, to extend generally horizontally to the front edge of said side wall. Thus, insertion of the roller 39a and its shaft is permitted by the clearance 112 normally found at the right of the roller, as viewed in FIGURE 9, which allows said roller to have its right end portion pulled outward, while its left end portion is in place in said wall aperture.

The left end portion of its shaft 52a may thus be fitted in the receiving aperture in the left wall 22a while the shaft is canted. Then the right hand portion of said shaft 52a between the ratchet 51a fixed thereon and a relatively thin metal washer 113, of diameter larger than that of the ratchet wheel 51a, between said ratchet and a relatively small but thicker washer 114, is slid into or out of position, while the wall 23a is sandwiched between said washers, as shown most clearly in FIGURE 9. The washer 113 has such a diameter that, when in position, as viewed in FIGURE 10, its peripheral edge engages the front wall 15a of the housing, specifically the flange 37a thereon, thereby acting to lock the right hand portion of the shaft 52a in its proper position at the inner end or in the bottom of the slot 111.

Proper lateral positioning of the top of the housing 14a with respect to the chassis 24a is insured by outstanding flanges 115 and 116 at the tops of the side walls 22a and 23a of said chassis, the outer edges of which respectively extend close to the housing side walls and limit movement of said housing to right and left. Such positioning of the bottom of said housing with respect to the chassis is insured by slitting and bending out a lug or tab 117 from the bottom portion of the side wall 22a and placing a sleeve 118 on the right hand end portion of the pivot member 21a, before assembly of the housing and chassis. Said sleeve 118 acts as a spacer between the lower portion of the side wall 23a and the lower portion of the right hand side wall 91.

Referring now to the third embodiment of my invention illustrated in FIGURES 14, 15, 16, 17 to 27, inclusive, and parts of FIGURES 10 and 11, there is shown a leaf dispenser 11b, somewhat like the dispenser 11a of the second embodiment. The major change in this dispenser, as compared with that of the second embodiment, is that the cover or housing 14b is of two-piece construction, with the parts 119 and 120 separately formed and with overlapped edge portions welded together.

The dispenser 11b is, as in the precedeing embodiment, illustrated as using a refill cartridge or carton 12b, similar to the carton 12a, to hold a stack of sheets, leaflets, or leaves 13. The present embodiment is also adapted for feeding leaves of the same material as was disclosed for the first embodiment. Such leaves can conceivably be employed with the enclosing cover or housing 14b of the dispenser and without a refill carton, although it would not be as convenient.

The dispenser housing 14b is formed in two parts, a top part 121 and a bottom part 122, said parts being spot welded together to facilitate manufacture and permit greater freedom of design. For that purpose the bottom part 122 has a rounded and inwardly-angled front portion 123, which thus brings the front surface of said assembled housing closer to the leaves 13 to be dispensed, thereby achieving a greater extension of an exposed leaf when the unit is operated.

An outwardly-curved lip 124 is incorporated at the top of an injection slot 125 to assist in guiding a leaflet from the unit, to protect against water splash, and at the same time creating the effect of a smaller opening or slot when viewed from an operator's position. The lower portion of the slot is defined by an upwardly and inwardly inclined portion 126 to improve the possibility of catching a leaf which might be curved downward and thus guide said leaf into the opening and out of the dispenser.

The housing elements 121 and 122 are formed to interfit with one another, that is, the lower element 122 has curved side flanges 127 which fit in corresponding indentations 128 in the upper element 121 and are spot welded or otherwise secured thereto. The front of the lower portion 122 may be extended up beyond the side flanges and curved, as indicated at 129, so as to fit behind the lower edge portion of the front wall 15b.

The upper member 121 comprises a normally vertical front wall 15b, desirably provided with one or more panels 130, inwardly embossed thereon to receive advertising and/or directions, normally vertical side walls 91b which extend below the bottom edge of the front wall 15b, as illustrated most clearly in FIGURE 17 and a forwardly and downwardly sloping top wall 19b. This upper member 121 has flange 88 which extend from the top section of the front portion, overlap the tops of the side sections 91b and are secured thereto in any desired manner including spot welding.

The housing 14b, comprising the assembly of the parts 121 and 122, is supported on a pivot or shaft 21b, desirably hollow, passing through the lower extensions of the side walls 91b and through side walls 22b and 23b of a supporting chassis or frame 24b. After assembly, the ends of the hollow shaft 21b are desirably peened or riveted over so as to prevent separation of the housing 14b from the underlying chassis 24b. The chassis 24b is in turn supported on a wall, or some suitable vertical surface, as by means of screws or other suitable means 92b passing through the rear wall 25b thereof. The apertures 93b through which the securing screws 92b pass are disposed at the centers of outwardly-embossed portion forming inwardly-opening cups 94b, which thus surround the means 92b and thereby prevent them scraping or otherwise interfering, during the application or removal, with the rear wall of the carton 12b which holds the leaves, by providing in effect a countersinking of the securing means.

The chassis 24b is shown provided with a shelf 26b, conveniently formed as by slitting it out from the rear wall thereof and bending it to a normally horizontal position as viewed most clearly in FIGURES 22 and 25, so as to underlie the carton 12b. The housing 14b, by virtue of its pivot on the rod 21b, is swingable from the closed position illustrated, to one where it lies with its front wall approximately horizontal and outstanding from the supporting wall and the chassis 24b. It is held in its normal or closed position by means of a spring latch in the form of a plate, like that designated 28a of the preceding embodiment as illustrated in FIGURE 11. Said latch is here, as in said previous embodiment, part of a lock, such as that previously designated 95, operable from outside the housing by means of a key (not shown) insertable through a key hole such as that designated 96 in said figure. In other words, the latch arrangement of the present embodiment corresponds with that of the preceding embodiment.

The carton 12b holding the leaves 13 is supported on the shelf 26b. It is guided in its placement and removable with respect to the chassis 24b, not only between the side walls 22b and 23b, but also between the projections or embossments 102b on said side walls. These projections are formed by inwardly pressing said side walls to an extent such that detents are provided for gripping the side walls of the carton 12b near the top thereof, as shown most clearly in FIGURE 24. These gripping portions 102b function like the projections 102 of the previous embodiment. Due to the relative lightness of the soap leaves, for which this dispenser is particularly designed but not limited to, I propose to use a block of wood or other similar weight, as in the preceding embodiment, where it is designated 24, for the same purpose.

FIGURES 21 to 27, inclusive, show a mechanism which is desirably employed for feeding the bottom leaf of a stack 13, so that it protrudes from the slot or chute 125 in the front wall of the bottom part of the housing 14b. Said slot is desirably of a length slightly greater than the length of the leaves to be dispensed, and is defined at upper and lower edges by flanges or lips 124 and 126, previously referred to, which define an outlet chute therebetween as shown in FIGURES 17, 22, and 25. Said chute 125 is deep enough so that the leaves do not fail to project themselves therethrough as fed through the mechanism and is in registry with the bottom part of the carton 12b. That is, said chute is offset toward the left side wall 91b of the housing 14b, because of the corresponding offset of the carton to provide the necessary space for the feeding mechanism, generally designated 38b.

Situated under the exposed leaflet 13, is a paddle type feed roller 39b of soft rubber or the like carried on a shaft 52b journaled in the side walls of the chassis. It is provided with four vanes 41b spaced around its axis at 90 degree intervals, as in the preceding embodiment, and generally shaped as an improvement over the feed roller 39 of the first embodiment.

The cardboard container or carton 12b in the present embodiment may correspond with that designated 12a in the preceding embodiment. The setting of the parts is such that the rubber vane 41b which has just delivered a leaflet comes to rest under the bottom of the stack of leaves about 1/8 inch from the front surface or edge of said stack, definitely in contact with and supplying support for said stack. The next or succeeding vane, which will feed out the next leaflet, also comes to rest in contact with the bottom of the stack of leaves, at a position just slightly forward of where said stack is supported by the bottom part of the carton, as in the preceding embodiment, and operates in a similar manner.

The feed roller 39b in the present embodiment, is actuated by a simple ratchet and pawl or feed hook type of device, which changes the reciprocation of a feed bar 43b, manually operated by the use of a feed lever 132, to a rotary action and utilizes a latching type of device to get a turning action in only one direction. The feed bar 43b is slidably carried in a guide 44b secured to the side of the chassis wall 23b, so that it is aligned with the major axis of the chassis, rather than being tilted, as in the preceding embodiment.

A combination return-spring time-delay device 45b is also utilized in this form of my dispenser. Said device is desirably supported on a flange 46b outstanding from the guide 44b and is used to prevent the rapid feeding of leaves. The delay may be two to four seconds between cycles, as in the preceding embodiment. The delay device is desirably a piston, such as designated 47a in FIGURE 10, which with the illustrated accessories functions as a pump in a cylinder 49b. It is combined with a return spring, such as designated 48a in said figure, in such a manner that the spring tries to push the piston against atmospheric pressure and draws a partial vacuum in the enclosing cylinder 49b. A small hole, such as designated 40a in FIGURE 10, may be in the cylinder 49b to allow air to bleed slowly thereto and thus let the piston 47a correspondingly slowly return. If a longer time delay is desired, leakage may be solely relied on.

As shown in FIGURES 14, 15 and 16, the construction of the lower portion of the carton 12b corresponds with the construction of such portion of the carton 12a of the preceding embodiment, including the connection thereto of a prong such as designated 68b, which corresponds with the prong 68a of said preceding embodiment.

The stack of leaves 13 is to be positioned, in the dispenser of the present embodiment, in a manner similar to that described in the preceding embodiment. In operation the user pushes or pulls down on the feed lever 132, detailed in FIGURE 26, as by applying a finger to the curved portion 133 thereof which projects beyond the right side wall of the housing, as viewed most clearly in FIGURE 21. This lever has an inner portion 134 which slides along the inside surface of the housing wall, being inwardly offset from the external portion as indicated at 135. Said inner portion is slidably mounted with respect to the inner surface of the side wall by being guided at its lower portion between flanges 136 and 137 which project inwardly from the side wall and define the sides of the aperture 138 through which said lever 132 projects.

The upper portion of said lever is guided between angular clips 139 and 141 which are formed by slitting and bending corresponding sections of said side wall. This lever has a flange or lug 142 at its upper end, apertured as indicated at 143 to receive the hooked or curved lower end portion of a coiled return spring 144, the upper hooked or curved end portion of which is carried by an apertured lug 145 near the top of the housing 14b. Downward movement of the lever 132 causes the flange 142 thereof to first take up the lost motion indicated in FIGURES 21 and 24, and then engage the flanged upper end portion 64b of the feed bar 43b. The feed hook or pawl-acting means 42b depends from the lower end portion 65b of said feed bar 43b. The latter is offset, as in the preceding embodiment, in order to allow for outward swinging of the dependent feed hook 42b upon engaging the ratchet 51b upon a downward movement of the feed bar 43b, as the operator presses down on the outwardly curved portion 133 of the feed lever 132. The connection of the ratchet 51b with its carrying shaft 52b is strengthened, as compared with the preceding embodiment, by the formation of an annular hub flange 140 thereon.

Such downward finger pressure effects a passing of the feed hook 42b over the rearmost tooth 78b of the ratchet 51b. A feeding operation of the roller 39a is effected upon return movement of the feed bar 43b and a corresponding movement of the feed hook 42b depending from said bar. The consequent engagement by the lower flange 77b on said hook with one of the four teeth 78b of the ratchet 51b, that is, the tooth at the right as viewed in FIGURE 22, turns the latter and the connected wheel 39b, counterclockwise about 90 degrees by action of the spring expanding after release. After the lowermost leaf has been pulled from the stack 13 against the resistance imposed by the prong 68b, it is pushed out by the sequential operation of the underlying vanes 41b of the feed roller 39b. The action is thus controlled, as previously described, and not dependent on the whim of the user for speed of discharge. The dispenser may then be reset for discharge of the next leaf by again pushing down on the feed bar 132 and allowing it to return.

In order to allow for insertion and removal of the feed roller 39b between the walls 22b and 23b of the chassis, the left side wall 22b is apertured for reception of the roller shaft 52b, while the right side wall 23b is provided with a slot 111b, formed as shown in FIGURE 22, to extend generally horizontally to the front edge of said side wall. Thus, insertion of the roller 39b and its shaft 52b is permitted by the clearance 112b, normally found at the right of the roller as viewed in FIGURE 24, which allows said roller to have its right end portion pulled outward while the left end portion is in place in said wall aperture.

The left end portion of the shaft 52b may thus be fitted in the receiving aperture in the left wall 22b while the shaft is canted. Then the right end portion of said shaft 52b, between the ratchet 51b fixed thereon and a relatively small diameter, thick washer 114b, is slid into or out of position while the wall 23b is sandwiched between said members, as shown most clearly in FIGURE 24. In the present embodiment it is not necessary to use a relatively thin, larger-diameter washer, corresponding with that designated 113 in the second embodiment because, with the present cover construction, the rubber feed roller 39b or the ratchet 51*b* contact the cover immediately upon the occasion of any tendency to ride forward to an undue extent. That is, the inward and downward curving of the front wall of the lower section 123 of the housing or cover functions to hold the ratchet 51*b* and its carrying shaft 52*b* within the desired bounds, without the need for an additional washer of large diameter.

Proper lateral positioning of the top of the housing 14*b* with respect to the chassis 24*b* is insured by outstanding flanges 115*b* and 116*b* at the tops of the side walls 22*b* and 23*b* of said chassis, the outer edges of which respectively extend close to the housing side walls and limit movement of said housing to right and left. Such positioning of the bottom of said housing with respect to the chassis is insured by slitting and bending out a lug or tab 117*b* from the bottom portion of the side wall 22*b* and placing a sleeve 118*b* on the right hand end portion of the pivot member 21*b*, before assembly of the housing and chassis. Said sleeve 118*b* acts as a spacer between the lower portion of the side wall 23*b* and the lower portion of the right hand side wall 91*b* of the chassis.

From the foregoing disclosure it will be seen that I have provided three forms of a sheet dispensing device. In the first form, the sheets or leaves are dispensed upon operation by a user who then releases the operating member and a time-delay insures against another leaf-discharging operation until a predetermined period has elapsed and the device is automatically reset. In the second form, the user merely sets the dispenser by bearing down on an operating element and a leaf is delivered upon the release of said element, the speed of the delivery being controlled by a time-delay device. In the third and preferred form of my invention, the operation is generally as in the second form, except that the time-delay mechanism has its axis normally vertical rather than inclined and an operating lever with an external manually engageable part is provided to avoid the insertion of dirty, wet fingers in the dispenser, which would cause stains to run down the front and water to enter the internals of the unit, possibly causing corrosion or otherwise leading to malfunction.

Having now described my invention in detail in accordance with the reqiurements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A dispenser for a stack of leaves of material comprising feeding means supportingly underlying the free edge portion of the bottom leaf of said stack, said feeding means comprising a supporting shaft turnable therewith and journaled about an axis disposed under said stack, bendable resilient vanes movable with and extending outward from said shaft to such a distance that at least one of said vanes always underlies a portion of said bottom leaf, ratchet mean turnable with said shaft, an actuator for said feeding means slidable between top and bottom positions at a side of said stack, pawl means suspended and swingable from said actuator to engage said ratchet means, turn said vanes and disengage a leaf from the bottom of said stack when the actuator is moved in one direction, while sliding over said ratchet means without turning said vanes when the actuator is moved in the other direction, and resilient means normally holding said actuator in its top position so that, upon moving said actuator from its top to its bottom position and then releasing, said actuator discharges a leaf upon movement in one direction and is returned to its top position by said resilient means.

2. A dispenser for a stack of leaves of material as recited in claim 1, wherein said pawl means engages said ratchet means and turns said vanes when the actuator is released and returned to top position by said resilient means.

3. A dispenser for a stack of leaves of material as recited in claim 1, wherein said pawl means engages said ratchet means and turns said vanes when the actuator is moved from its top to its bottom position.

4. A dispenser for a stack of leaves of material as recited in claim 1, wherein said stack is contained in a carton, and a portion of the bottom wall of which is omitted near the front so as to expose the bottom leaf of said stack for engagement by said feeding means.

5. A dispenser for a stack of leaves of material as recited in claim 1, wherein there is a housing for enclosing said material, said housing having a slot in its front wall adjacent the free edge of the material when engaging said feeding means, whereby the bottom leaf of said stack may be fed out of said slot.

6. A dispenser for a stack of leaves of material as recited in claim 1, wherein there is a housing for said dispenser formed as upper and lower parts secured together, said lower part being curved downwardly and inwardly to bring its inner surface closer to the leaves enclosed thereby to effect a greater extension of exposed leaf during operation, the lower part of said housing having a slot in the front wall adjacent to the free edge of the bottom leaf of the stack engaging said feeding means, whereby said bottom leaf may be fed out of said slot, said slot being defined by an upper outwardly curved lip to assist in guiding each leaf from the dispenser, to protect against water splash and to create the effect of a smaller opening when viewed from the operator's position, and the lower portion of said slot being defined by a downwardly and outwardly inclined portion to assist in catching a leaf, which might be curved down, and guiding said leaf down and out of the dispenser.

7. A dispenser for a stack of leaves of material as recited in claim 1, wherein there is an opening in the front of said dispenser and a finger-engageable portion of said actuator is accessible therethrough.

8. A dispenser for a stack of leaves of material as recited in claim 1, wherein there is a housing for said dispenser formed with an opening in the lower portion of side wall thereof, the front housing wall curving around said opening which provides for entry of the upper portion of a feed lever, said upper portion being supported from the upper part of said housing by a coiled tension spring, the lower portion of said feed lever being curved outwardly and upwardly to be engaged by a finger for actuating, through said lever, said feeding means of the dispenser.

9. A dispenser for a stack of leaves of material as recited in claim 1, wherein there is a chassis for holding said material, a housing for said dispenser, means pivoting said housing adjacent its lower portion to the lower portion of said chassis so that it may be swung outward to open position or upward to a position enclosing said stack, and spring latch means at the upper portion of said housing, said chassis having a shoulder in its upper portion behind which will snap said latch means when the housing is swung to upper position to hold it closed, said latch means being operable from the outside to allow said housing to open.

10. A dispenser for a stack of leaves of material as recited in claim 9, wherein said spring latch means is part of a lock and key operable from the outside of said housing.

11. A dispenser for a stack of leaves as recited in claim 1, wherein there is a housing for enclosing said material, a chassis underlying said housing for the support thereof, said chassis comprising a rear wall adapted to be secured to a vertical supporting surface, side walls projecting forwardly therefrom, a shelf projecting forwardly from said rear wall, a carton holding said leaves and supported on said shelf between said side walls, and means extending from said side walls to hold said carton in place.

12. A dispenser for a stack of leaves as recited in claim 1, wherein there is a chassis normally covered by a housing and the actuator for said feeding means is in two parts, the inner part being a feed bar mounted on a side wall of said chassis, an outer part of said actuator being a feed lever mounted on a side wall of said housing adjacent said chassis side wall, a coil tension spring urging said lever to its upper position, said feed lever having an inwardly-extending normally horizontal lug to which said spring is connected and which normally overlies the upper portion of said feed bar, the lower end portion of said actuator lever protruding through an aperture in a side wall of said housing and having a portion at its lower end curved outwardly and upwardly to provide a finger-engageable portion for the operation thereof, whereby when said finger-engageable portion is depressed the lug on the top of the feed lever engages the top of the feed bar and moves it down to provide for the discharge of a leaf.

13. A dispenser for a stack of leaves as recited in claim 11, wherein the means extending from said side walls to hold said carton are projections inwardly-embossed in said side walls and positioned to frictionally grip the adjacent walls of said carton.

14. A dispenser as recited in claim 11, wherein there is a guide for said actuator mounted on one side wall of said chassis, a flange provided at the top of said actuator, a bracket mounted on said flange, said bracket comprising a finger-engageable portion for operation thereof, a front flange depending therefrom, a rear flange upstanding therefrom to limit inward movement of an engaging finger, and a time-delay device mounted beneath said finger-engageable portion so as to return it only slowly to normal position.

15. A dispenser as recited in claim 11, wherein the actuator comprises outer and inner parts, there is a guide for the outer part on the inner surface of a side wall of said housing, a flange provided at the top of the said outer part, a coil tension spring connecting said flange to the top portion of said housing to urge said outer part to upper position, said outer part protruding through an aperture in a side wall of said housing and carrying a finger-engageable portion at the lower end thereof, and said flange engaging the top of said inner part, when it is manually moved to lower position, to operate the feeding means.

16. A dispenser for a stack of leaves of material comprising feeding means supportingly underlying the free edge portion of the bottom leaf of said stack, said feeding means comprising a supporting shaft turnable therewith and journaled about an axis under said stack, four bendable resilient vanes movable with and extending outward from said shaft to such a distance that one of said vanes, when the operation of said feeding means stops, always underlies the outer edge portion of said bottom leaf and the succeeding vane always underlies a portion of said leaf near the rear edge thereof, means for turning said shaft to cause the vanes to successively engage and feed the bottom leaf from said stack, thereby feeding only one leaf at a time, and a time-delay device connected to said turning means so that, upon actuation of said turning means and then releasing, said turning means returns only slowly to initial position to thereby then discharge a leaf from said stack.

17. A dispenser for a stack of leaves of material comprising feeding means supportingly underlying the free edge portion of the bottom leaf of said stack, said feeding means comprising a supporting shaft turnable therewith and journaled about an axis under said stack, four bendable resilient vanes equally spaced around, movable with and extending outward from, said shaft to such a distance that at least one of said vanes, when the operation of said feeding means stops, always underlies a portion of said bottom leaf, means for turning said shaft to cause the vanes to successively engage and feed the bottom leaf from said stack, thereby feeding only one leaf at a time, and a time-delay device connected to said turning means so that, upon actuation thereof and then releasing, said turning means returns only slowly to initial position to thereby prevent an actuation quickly thereafter for the discharge of another leaf from said stack.

18. A dispenser for a stack of leaves of material comprising a housing for enclosing said material, feeding means in said housing underlying the free edge portion of the bottom leaf of said stack, said housing having a slot in its front wall adjacent the free edge of said bottom sheet when supported by said feeding means, said feeding means comprising a supporting shaft turnable therewith and journaled about an axis generally parallel to said slot and disposed under said stack, resiliently bendable vanes extending outward from said shaft to such a distance that one always supportingly engages the outer edge portion of said bottom leaf of material when a feeding operation terminates, a ratchet fixed on one end portion of said shaft, an actuator for said feeding means slidably mounted at the side of said housing, a feed hook swingable from the bottom portion of said actuator to turn said ratchet when said actuator is moved in one direction and disengage therefrom when the actuator is moved in the other direction, resilient means normally holding said actuator in elevated position, a finger-engageable portion on said actuator, and a time-delay device underlying said finger-engageable portion so that, upon pushing down on said actuator and then releasing, said actuator rises only slowly.

19. Feeding means for a stack of leaves in a leaf dispenser comprising a turnable supporting shaft journaled about a generally horizontal axis under said stack, four resilient bendable vanes equally spaced around, movable with and extending outward from, said shaft, means for turning said shaft to feed one leaf at a time from the bottom of said stack, and a time-delay device connected to said turning means so that, upon actuation thereof and then releasing, said turning means returns only slowly to normal position.

20. In a dispenser for a stack of leaves, a chassis comprising a sheet metal structure having a rear wall adapted to be mounted on a vertical supporting surface, side walls projecting forwardly therefrom, means projecting toward one another from said side walls, a shelf for the support of leaves to be used in said dispenser projecting forwardly from said rear wall between said side walls and between said rear wall and said means projecting toward one another, a guide mounted on the outer surface of one side wall, a leaf actuator slidable in said guide, a flange at the top of said actuator, a bracket mounted on said flange, said bracket comprising a finger-engageable portion for operation thereof, a front flange depending therefrom, a rear flange upstanding therefrom to limit movement of an engaging finger, and resilient means for returning said actuator to normal position after operation thereof.

21. A dispenser for a stack of leaves comprising a sheet metal chassis structure having a rear wall adapted to be mounted on a vertical supporting surface, laterally-spaced side walls projecting forwardly therefrom and united thereby, but free from one another at their front edges for the entire height thereof, means projecting toward one another from said side walls to hold a stack of leaves in place and prevent it from falling forward, a shelf for the support of such a stack of leaves projecting forwardly from said rear wall between said side walls and between said rear wall and said means projecting toward one another, said shelf extending a distance less than the width of said side walls, whereby portions of the leaves are unsupported, and feeding means supportingly underlying said unsupported portions.

22. A dispenser for a stack of leaves as recited in claim 21, comprising a carton as part thereof, supported on said shelf and holding the leaves of said stack, wherein the means projecting toward one another from said side walls are inwardly embossed and so positioned that they frictionally grip the adjacent walls of said carton.

23. A dispenser for a stack of leaves as recited in claim 21, comprising a housing, means pivoting said housing adjacent its lower portion to the lower portion of said chassis so that it may be swung outward to open position or upward to a position enclosing said stack, wherein the means projecting toward one another from said side walls are flanges inturned from the front edges thereof.

References Cited by the Examiner

UNITED STATES PATENTS

| | | | |
|---|---|---|---|
| 825,476 | 7/1906 | Osborn | 271—36 |
| 1,661,357 | 3/1928 | Boivin | 221—154 X |
| 2,081,177 | 5/1937 | Hope | 221—46 X |
| 2,197,284 | 4/1940 | Wooster | 226—130 X |
| 2,200,842 | 5/1940 | Gray | 271—41 |
| 2,240,389 | 4/1941 | Campbell | 221—16 |
| 2,258,358 | 10/1941 | Harvey | 221—16 |
| 2,443,376 | 6/1948 | Case | 221—16 |
| 3,056,529 | 10/1962 | De Shon | 221—15 |

M. HENSON WOOD, JR., *Primary Examiner.*

ROBERT B. REEVES, *Examiner.*